| X | Y | OUTPUT |
|---|---|---|
| UP | UP | DOWN |
| UP | DOWN | UP |
| DOWN | UP | UP |
| DOWN | DOWN | UP |

3,152,262

TRANSFER CIRCUIT FOR CONTROLLING DATA TRANSFER FROM ADDER TO ACCUMULATOR

William N. Carroll, Wappingers Falls, Raymond W. Emery, Poughkeepsie, and Joseph J. Moyer, Wappingers Falls, N.Y., assignors to International Business Machines Corporation, New York, N.Y., a corporation of New York Filed Sept. 26, 1958, Ser. No. 763,522
4 Claims. (Cl. 307—88.5)

This invention relates to transfer circuits and more particularly to information transfer circuits which provide a latch for signals indicative of bistable states.

It is conventional to couple an adder to an accumulator, provide signals representing information to the input of the adder and at a predetermined time in response to a clock level transfer the sum contained in the adder to the accumulator. In some of the prior art, an adder is coupled to the accumulator and the transfer of information takes place when the accumulator is enabled, the adder being inhibited from receiving or processing information during the transfer time. In other systems, upon change of status of the accumulator, i.e., set or reset, a signal is provided therefrom to start the generation of a new sum in the adder. If the new sum reaches the output of the adder before the clock level controlling the transfer has blocked the coupling circuits, an erroneous sum appears at the input to the accumulator. To solve the problem of transferring erroneous sums, the circuits of the present invention are latched and prevented from changing the values at the accumulator input until the clock level is down. However, the adder per se is permitted to perform at least some of its processing on new information while the clock level is up.

Briefly stated, the transfer circuit of the present invention employs logical circuits for selective transfer of data signals from an information source to the input of a utilization device. The transfer circuit is operated by a control signal from a clock and comprises two storage logical devices for representing a binary number and its complement in response to the control signal, two coupling logical devices for presenting information signals from a source to the storage devices, feedback connections from the output of one of the storage devices to the input of the other and to one of the coupling devices, and a feedback connection from the output of the other storage device to the other coupling device, the feedback connections thereby preventing change of the storage devices while the control signal is present.

An object of the present invention is to provide an improved transfer system wherein a parallel transfer of information is made from one arithmetic unit to another.

Another object of the invention is to provide an improved transfer device including a latch for control of the passage of information.

Yet another object of the invention is to provide an improved coupling device for the control and transfer of information between a pair of registers or the like.

A further object of the invention is to provide an improved transfer device for the selective transfer of information in response to a control signal wherein a first pair of logical circuits are employed to present complementary indications of a pair of information-representing states from a source to a second pair of logical circuits which hold the indications for so long as the control signal is applied.

An additional object is to provide a buffer between a pair of arithmetic devices which selectively transfers information and alternately isolates the arithmetic devices.

Other objects of the invention will be pointed out in the following description and claims and illustrated in the accompanying drawings which disclose by may of example the principle of the invention and the best mode which has been contemplated of applying that principle.

A detailed description of the operation of the adder per se and its relation to the transfer circuit appears in U.S. Patent Number 2,966,305, issued December 27, 1960, Rosenberger, "Simultaneous Carry Adder" (application Serial Number 678,573, filed August 16, 1957, assignee IBM).

Figure 1:
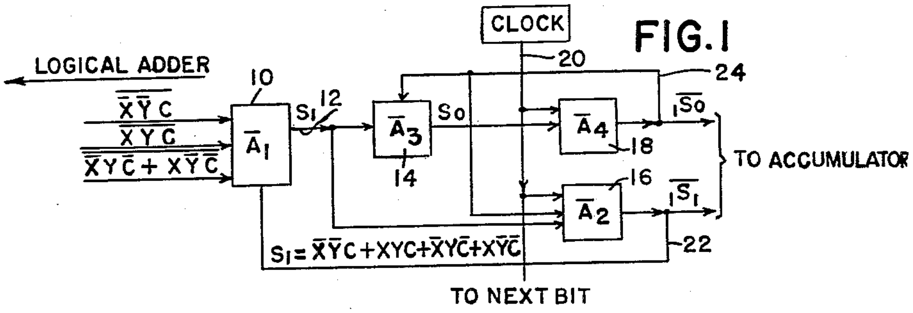
FIGURE 1 is a block diagram of the invention.

The logical block diagram of FIGURES 1*a*, 1*b* and 1*c* of U.S. Patent Number 2,966,305, issued December 27, 1960, Rosenberger, "Simultaneous Carry Adder," illustrates the manner in which addition is performed and illustrates, by example, an application of the transfer device of the present invention.

In this application the following conventions will be used: when X equals 1, $\overline{X}$ equals 0; when Y equals 1, $\overline{Y}$ equals 0. The Boolean expression (1) will correspond to ground physically; the Boolean expression (0) will correspond to −3 volts physically. The definition above will be recognized as arbitrary since logical expressions are commonly defined in terms of true and false. This is to say that true may be assigned the value of either one or zero and then false becomes the opposite of the value assigned.

In the $\overline{\text{AND}}$ circuit, the only time that the output is down is when all inputs are up. Considering the logical function positively, the equivalent of the $\overline{\text{AND}}$ circuit is an AND circuit having its output connected to an inverter. The output of the inverter will be negative when all inputs to the AND circuit are positive; otherwise, the output of the inverter will be positive.

Figure 2:
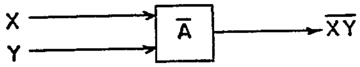
FIGURE 2 is a functional block diagram of an AND NOT $(\overline{A})$ circuit and the truth table for such a circuit.

In FIG. 2, a signal representing the sum $S_1$ is generated by $\overline{\text{AND}}$ 10 $(\overline{A}_1)$ and is applied via a line 12 both to $\overline{\text{AND}}$ circuits 14 and 16 ($\overline{A}_3$ and $\overline{A}_2$ respectively). The output of $\overline{A}_3$ circuit 14 is applied to $\overline{\text{AND}}$ circuit 18. The $\overline{\text{AND}}$ circuits 10, 14, 16 and 18 form a D.C. latching circuit on the output. When information is being transferred from the adder to the accumulator a positive clock pulse is applied to a line 20, and a falling level appears at the output of either the sum line ${}_1\overline{S}_1$ or the sum line ${}_1\overline{S}_0$ from $\overline{\text{AND}}$ circuits 16 and 18 respectively. This falling level is used to set the accumulator flip-flop (not shown). Since this sum may have changed the status of the accumulator flip-flop and thus started the information of a new sum in the adder, this new sum could reach $\overline{\text{AND}}$ circuits 16 and 18 before the clock level has been returned to the down position and an erroneous sum would therefore appear at the output ${}_1\overline{S}_0$ and ${}_1\overline{S}_1$. To prevent the generation of erroneous sums, the Signal Latching Transfer Circuit is used.

To form the latching transfer circuit the output of $\overline{\text{AND}}$ circuit 16 is fed back to $\overline{\text{AND}}$ circuit 10 on line 22 and the output of $\overline{\text{AND}}$ circuit 18 is fed back to $\overline{\text{AND}}$ circuits 14 and 16 on line 24. These feedback paths effectively latch the output of $\overline{\text{AND}}$ circuits 10 and 14 and prevent the outputs of $\overline{\text{AND}}$ circuits 16 and 18 from changing except when the clock line is in the up position.

When information is not being transferred between the adder and the accumulator, the clock line 20 is negative and when in this state, causes outputs of $\overline{\text{AND}}$ circuit 16 and $\overline{\text{AND}}$ circuit 18 to be positive regardless of their other input conditions. When the clock line 20 is changed to a positive level, it allows the outputs of $\overline{\text{AND}}$ circuit 16 and $\overline{\text{AND}}$ circuit 18 to assume states depending upon the logical inputs of these circuits. A positive level on the output of $\overline{\text{AND}}$ circuit 10 on line 12 is indicative of a binary "one" and causes the output of $\overline{\text{AND}}$ circuit 16 to fall to a negative level when the clock line 20 is taken to the positive level. The fall of the output of $\overline{\text{AND}}$ circuit 16 is utilized to place a one in the accumulator flip-flop. The negative output of $\overline{\text{AND}}$ circuit 16 is also fed back by way of line 22 to $\overline{\text{AND}}$ circuit 10 and this negative signal insures that as long as the clock line 20 is positive, the positive output of $\overline{\text{AND}}$ circuit 10 cannot change to a negative level regardless of changes on the logical inputs of $\overline{\text{AND}}$ circuit 10. The output of $\overline{\text{AND}}$ circuit 18 remains positive since the inputs of $\overline{\text{AND}}$ circuit 14 are positive. Therefore, the output of $\overline{\text{AND}}$ circuit 14 and one input to $\overline{\text{AND}}$ circuit 18 remain negative.

Assume that the logical portion of the adder produces the condition for a sum of zero. All the logical inputs to $\overline{\text{AND}}$ circuit 10 are then positive and the output line 12 is negative. This negative output is applied to $\overline{\text{AND}}$ circuit 14 to produce a positive level at its output to an input of $\overline{\text{AND}}$ circuit 18. When the clock line 20 goes from negative to positive, the output of $\overline{\text{AND}}$ circuit 18 falls to a negative level and this falling transition sets a zero in the accumulator flip-flop. The output $_1\overline{S}_1$ of the $\overline{\text{AND}}$ circuit 16 remains positive regardless of the state of $\overline{\text{AND}}$ circuit 10 since the output of $\overline{\text{AND}}$ 18 is negative and is applied as an input to $\overline{\text{AND}}$ circuit 16 via line 24. The negative output of $\overline{\text{AND}}$ circuit 18 is also applied via line 24 to $\overline{\text{AND}}$ circuit 14 keeping the latter output and consequently the input of $\overline{\text{AND}}$ circuit 18 positive regardless of the state of $\overline{\text{AND}}$ circuit 10.

NOT AND

In FIGURE 2 there is shown the logical block diagram of a NOT AND ($\overline{\text{A}}$) circuit used extensively in the following circuits for "Anding" inputs and presenting this "AND" function as an output signal that is the inverse of the input. The $\overline{\text{AND}}$ circuit is required to accept at least three inputs and drive other logical blocks such as $\overline{\text{A}}$ and Inverter. From the truth table of FIGURE 2 adjacent to the function block diagram there is shown the conditions of the inputs and the resulting condition of the associated output. It will be noted that when both X and Y are up the input is down. This truth table will be recognized as NOT BOTH (NOT ALL) or Sheffer Stroke. In all other conditions, the output will be up. A logical operator which is an equivalent device employing positive logic will be described later with reference to the drawings.

Figure 3:
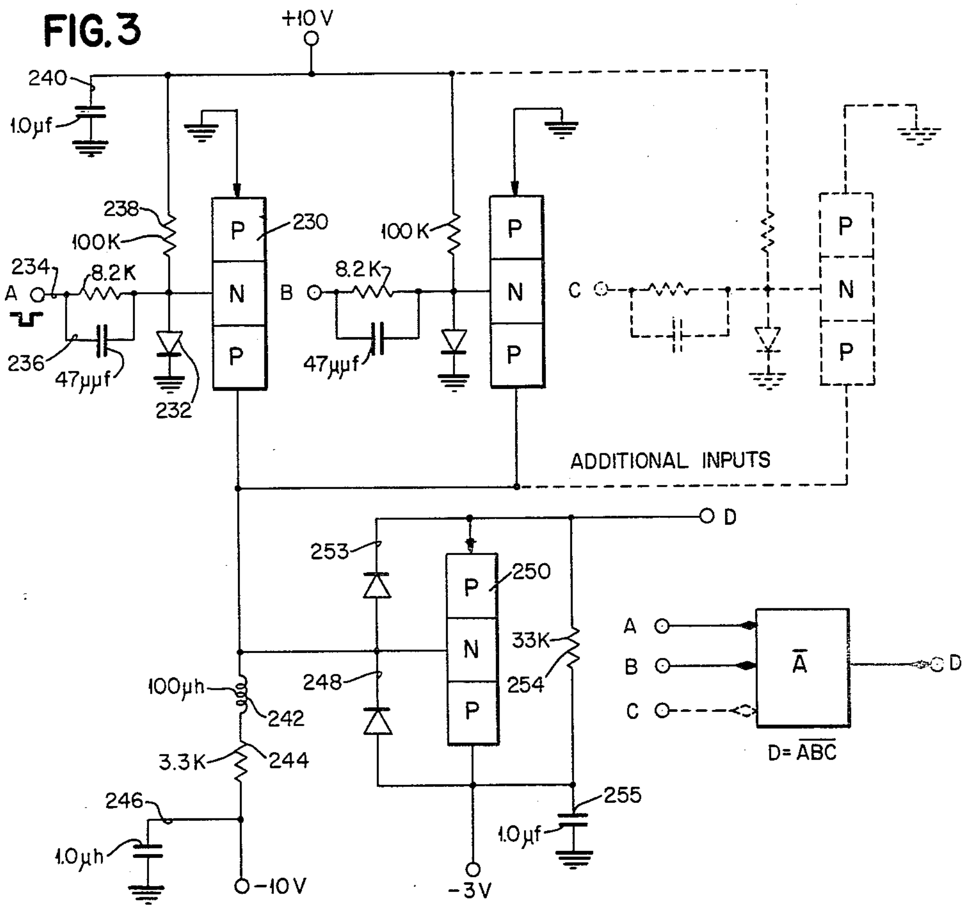
FIGURE 3 is the transistor diagram of an $\overline{A}$ circuit which is illustrated in block form in FIGURE 2.

With reference to FIGURE 3, an $\overline{\text{A}}$ circuit is shown consisting of inverters connected in parallel, one inverter for each input. If any one or all of the inverters are conducting because the corresponding inputs are down, the resulting current flow through the common collector would cause the output level to rise to 0 volt. If all inputs are up, then each inverter would be cut off and the output level would be down to −3 volts. Each of the inverters comprise identical components and only one inverter will be described. The emitter of the PNP junction transistor 230 is connected to ground and the base is returned to ground through a diode 232. The signal is applied at A to the base through an 8.2K resistor 234 in parallel with a condenser 236. The base is connected to a +10 volts D.C. through a 100K resistor 238. A 1 microfarad decoupling condenser 240 is connected between +10 volts D.C. and and resistor 232 to ground. The common load consisting of 100 microhenry coil 242 and a 3.3K resistor 244 in series is connected to a −10 volts D.C. A 1 microhenry condenser 246 is connected to the −10 volts D.C. line for decoupling purposes. The output at the collector of the inverters is clamped at a −3 volts through a diode 248 connected between the collectors of the transistors to −3 volts D.C.

The inverter output is applied to an emitter follower, and the output of the $\overline{\text{A}}$ circuit is taken from D. A diode 253 is connected between the base and the emitter of transistor 250, a 33K resistor 254 is connected between the emitter and the collector, and a 1 microfarad decoupling condenser 255 is connected between the collector of the transistor 250 to ground. It will be noted that additional outputs as shown in dotted lines, may be added to the $\overline{\text{A}}$ circuit as desired.

It will be understood that the transistor circuits are merely illustrative of those which may be used to perform the invention and it is pointed out that other transistor circuits or other logical devices utilizing other circuit elements such as vacuum tubes, magnetic cores, etc., may be used in the practice of the invention according to the principles taught herein.

While there have been shown and described and pointed out the fundamental novel features of the invention as applied to a preferred embodiment, it will be understood that various omissions and substitutions and change in the form and details of the device illustrated and in its operation may be made by those skilled in the art without departing from the spirit of the invention. It is the intention, therefore, to be limited only as indicated by the scope of the following claims.

What is claimed is:

1. In data processing apparatus, a device for the transfer of information signals, each of which is in one or the other of two mutually exclusive states, such as true and false, including a plurality of logical circuits each having input and output means and adapted to provide a false output signal at said output means when said input means are exclusively true and otherwise to provide a true output signal, comprising: two transfer logical circuits for selective transfer of said information signals, each signal associated with one of said mutually exclusive states, a source of true and false control signals coupled to input means of said transfer logical circuits for normally providing false signals and for selectively providing true signals thereto whereby said transfer logical circuits normally provide true signals at their output means and provide a false signal at one or the other of their output means when said control signal is true, a source of true and false information signals which together represent one or the other of said mutually exclusive states, an input logical circuit coupled to said source of information signals for receiving the latter at its input means and presenting one or the other of the true and false signals at its output means, a complementing logical circuit coupled to said input logical circuit for receiving one or the other of the true and false signals at its input means and presenting the complement at its output means, means coupling the output means of said input logical circuit to the input means of the one of said transfer circuits associated with said false signal, means coupling said output means of the complementing logical circuit to said input means of the one of the transfer logical circuit associated with the true signal, means coupling the output of the transfer circuit associated with said true signal to input means of said complementing logical circuit and to input means of said transfer circuit associated with the false signal, and means coupling the signal at the output means of said transfer circuit associated with the false signal to the input means of the input logical circuit.

2. In data processing apparatus, a transfer circuit including logical circuits each having inputs and an output and adapted to provide a false output signal when said inputs are all true signals and otherwise to provide a true output signal comprising a first logical circuit having at least three inputs and an output, a data source providing true and false signals to first and second of said inputs to said first logical circuit, a second logical circuit having three inputs and an output, a third logical circuit having two inputs and an output, means coupling said output of said first logical circuit to individual first inputs of said second and third logical circuits, a fourth logical circuit having two inputs and an output, means coupling said output of said third logical circuit to a first of said inputs of said fourth logical circuit, means coupling said output of said fourth logical circuit to the second of said inputs of said third logical circuit and to the second of said inputs of said second logical circuits, means coupling said output of said second logical circuit to a third of said inputs to said first logical circuit, a source of true and false clock signals, and means coupling said clock signal source to a third input of said second logical device and to a second input of said fourth logical device.

3. In information handling apparatus, a transfer circuit employing logical circuits each having at least two inputs and an output wherein said output normally provides a binary one irrespective of the binary states of said inputs, but when operated provides a binary zero at said output in response to the simultaneous presence of binary one values at said inputs, comprising: first, second, third and fourth of said logical circuits, said second logical circuit having an input coupled to the output of said first logical circuit and having its output coupled to one of said inputs of said first logical circuit, said third logical circuit having an input coupled to the output of said first logical circuit, said fourth logical circuit having an input coupled to the output of said third logical circuit and having its output coupled to respective inputs of said second and third logical circuits, a source of binary one values coupled to inputs of said second and fourth logical circuits for selective application thereto, and means providing binary values to the other of said inputs of said first logical circuit.

4. A transfer device having a plurality of logical circuits, each logical circuit having at least two inputs and an output, each of said logical circuits constructed and arranged to provide a false output signal when said inputs are all true signals and otherwise to provide a true output signal, said transfer device comprising a first, second, third and fourth of said logical circuits, means coupling the output of said first circuit to one of the inputs of said second and third circuits, means coupling the output of said second circuit to one of the inputs of said first circuit, means coupling the output of said fourth circuit to other inputs of said second and third circuits respectively, means coupling the output of said third circuit to one of the inputs of said fourth circuit, means providing signals to the other of said inputs to said first circuit, a source of true and false clock signals, and means coupling said clock signals to the remaining inputs of said second and fourth circuits.

References Cited in the file of this patent

UNITED STATES PATENTS

| | | |
|---|---|---|
| 2,132,213 | Locke | Oct. 4, 1938 |
| 2,719,670 | Jacobs et al. | Oct. 4, 1955 |
| 2,729,773 | Steele | Jan. 3, 1956 |
| 2,733,430 | Steele | Jan. 31, 1956 |
| 2,733,431 | Steele | Jan. 31, 1956 |
| 2,860,294 | Steele | Nov. 11, 1958 |
| 2,898,040 | Steele | Aug. 4, 1959 |

OTHER REFERENCES

Electrical Engineering (Felker), December 1952, pp. 1103–1108.